United States Patent
Erwin

[15] 3,692,425
[45] Sept. 19, 1972

[54] COMPRESSOR FOR HANDLING GASES AT VELOCITIES EXCEEDING A SONIC VALUE

[72] Inventor: John R. Erwin, Cincinnati, Ohio
[73] Assignee: General Electric Company
[22] Filed: Jan. 2, 1969
[21] Appl. No.: 788,359

[52] U.S. Cl............415/181, 415/DIG. 1, 416/236
[51] Int. Cl............................F04d 29/58, F04d 29/38
[58] Field of Search......415/119, 181; 238/134, 122, 238/122 BC, 120, 132; 416/236, 237, 196

[56] References Cited

UNITED STATES PATENTS

| | | | |
|---|---|---|---|
| 2,839,239 | 6/1958 | Stalker | 230/134 |
| 2,920,864 | 1/1960 | Lee | 230/134 |
| 2,938,662 | 5/1960 | Eckert et al. | 230/134 |
| 3,193,185 | 6/1965 | Erwin et al. | 230/122 |
| 3,442,441 | 5/1969 | Dettmering | 230/132 |

FOREIGN PATENTS OR APPLICATIONS

| | | | |
|---|---|---|---|
| 1,012,041 | 4/1952 | France | 230/134 |
| 1,108,374 | 6/1961 | Germany | 230/122 |

Primary Examiner—Henry F. Raduazo
Attorney—Derek P. Lawrence, Thomas J. Bird, Jr., Lee H. Sachs, Frank L. Neuhauser, Oscar B. Waddell and Joseph B. Forman

[57] ABSTRACT

In the fan portion of a turbofan engine, rotor blades comprise a primary cambered airfoil and an auxiliary airfoil. Where air flow exceeds a sonic velocity relative to the blades, the throat section between adjacent blades positions the normal air shock wave on the auxiliary airfoil. Each auxiliary airfoil forms a nozzle in combination with the pressure surface of its adjacent primary airfoil. This minimizes energy losses normally associated with such normal shock waves riding on the suction surfaces of cambered airfoils in regions of relatively thick boundary layer air. Lateral struts projecting from the primary airfoil, and used to position the auxiliary airfoil, create oblique shock waves which weaken the normal shock wave and minimize energy losses associated with a normal shock wave's effect of distributing boundary layer air on an airfoil surface. These features are also effective in reducing the generation of noise.

7 Claims, 6 Drawing Figures

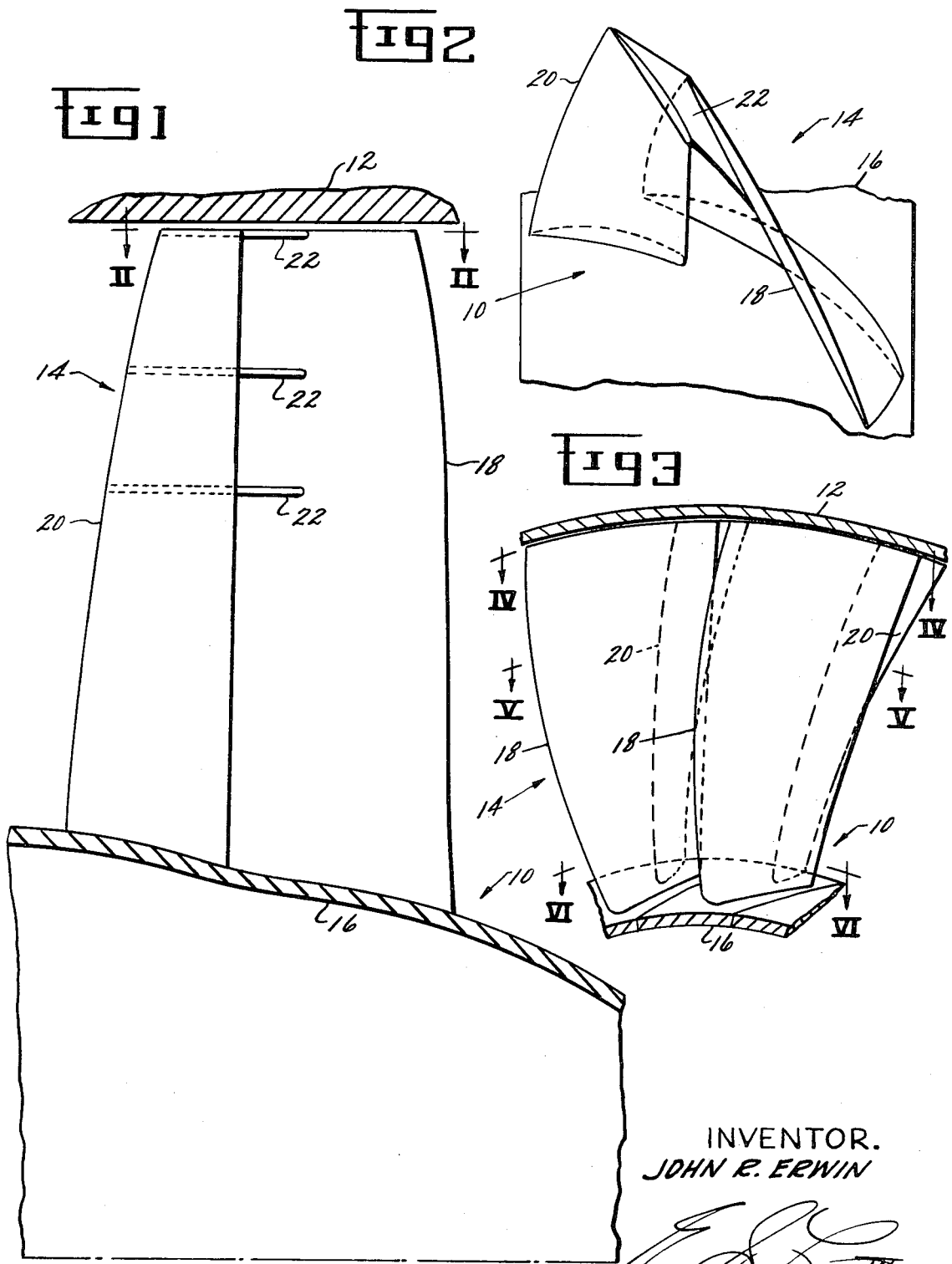

INVENTOR.
JOHN R. ERWIN

ATTORNEY

COMPRESSOR FOR HANDLING GASES AT VELOCITIES EXCEEDING A SONIC VALUE

The present invention relates to improvements in axial flow compressors and particularly to that type of compressor commonly referred to as a "fan," employed in the propulsion of aircraft.

Turbofan engines have, in the past decade, been widely adopted for the subsonic propulsion of aircraft. In general, such engines comprise a large diameter, bladed rotor, which pressurizes an air stream which is discharged in whole, or in part, from a nozzle to provide thrust for the propulsion of aircraft.

In order to most effectively take advantage of the cycle capabilities of such engines, the diameters and rotational speeds of the fan rotor are increased to the maximum possible extent consistent with other parameters affecting the overall engine performance and consistent with the mechanical strength of available materials. This leads to the necessity for air flow to exceed a sonic velocity (Mach 1) in traveling through the passageways defined by adjacent blades of the rotor.

Whenever there is flow of a compressible fluid, as air, relative to an object such as the blades of a compressor or fan rotor, various forms of shock waves will be generated. Of particular significance are the normal shock waves which form in the passageways between adjacent blades of such rotors. These shock waves result from the fact that the passageway defined by adjacent blades no longer supports supersonic flow and there results a sharp decrease in air velocity in a plane normal to the direction of air flow between the blades. This occurs at a shock wave across which there is a sharp rise in pressure.

Under design conditions for the fan, this shock wave is a standing wave, relative to the blades, riding at one side on the pressure surface of the blade and projecting towards the next adjacent blade.

While certain energy losses are inherent in such shock waves and must be accepted in order to obtain the cycle advantages referred to above, there is a further loss associated with the fact that the shock wave, as it rides on the pressure surface of the blade, creates a sharp pressure gradient across the blade surface in an area of relatively thick boundary layer air. This condition results in boundary layer separation, turbulence and resultant energy losses which are detrimental to the overall efficiency of the fan. Further, the resultant boundary layer separation creates turbulence in the air stream discharged from the rotor blades. This turbulence and the velocity gradients that exist in the fan stream discharge are a significant factor in the generation of objectionable noise in the air stream. Such noise may be propagated from the engine and is particularly undesirable where the engine is employed in the propulsion of aircraft over populated areas.

Accordingly, one object of the invention is to improve the efficiency of compressors and fans having high peripheral speeds and particularly to do so by minimizing energy losses associated with the turbulent condition caused by normal shock waves in rotor blade cascades having flow velocities exceeding a sonic value.

Another object of the invention is to minimize the generation of objectionable noise in fans and compressors having high peripheral speeds.

These ends are attained in a compressor having an outer, cylindrical duct wall and a bladed rotor, driven to pressurize a gas stream within this duct. The rotor has a hub from which angularly spaced blades project, being disposed in a circumferential row. Each blade comprises a primary, cambered airfoil and an auxiliary airfoil, spaced from the pressure surface of the primary airfoil with the leading and trailing edges of the auxiliary airfoil being respectively disposed upstream and downstream of the trailing edge of the primary airfoil. In radial portions of the blades, where there is relative flow of air at a velocity exceeding a sonic value, adjacent primary airfoils define a flow passage which disposes the resultant normal shock wave downstream of the trailing edge of the primary airfoil with the shock wave riding on the auxiliary airfoil. Further, the auxiliary airfoil forms, in combination with the pressure surface of the primary airfoil, a nozzle for accelerating air flow across the surface of the auxiliary airfoil, on which the normal shock wave rides. This creates an intermediate pressure zone between the shock wave and the trailing edge of the airfoil to minimize pressure gradients and also provides a thin, strong boundary layer on the surface of the auxiliary airfoil which does not tend to become separated by the normal shock wave riding thereon.

The auxiliary airfoil may be attached to the primary airfoil by struts which extend into the plane of the normal shock wave to produce oblique, three-dimensional shock waves which weaken the pressure gradient of the normal shock wave.

Such transverse struts, producing oblique shock waves, may also be used without the auxiliary airfoil to weaken the normal shock wave pressure gradient and thereby minimize separation of boundary layer air and the energy losses associated therewith.

Another feature of the invention rests in extending the auxiliary airfoil to the hub end of the blade where subsonic velocities exist. The inner extension of the primary airfoil may then be employed to provide greater turning of the air flow in these regions.

The above and other related objects and features of the invention will be apparent from a reading of the following description of the disclosure found in the accompanying drawings and the novelty thereof pointed out in the appended claims.

In the drawings:

FIG. 1 is a longitudinal section through a fan rotor embodying the present invention;

FIG. 2 is a view, taken on line II—II in FIG. 1, showing one blade of the present invention;

FIG. 3 is a section, on a reduced scale, taken on line III—III, in FIG. 1;

Figure 4:
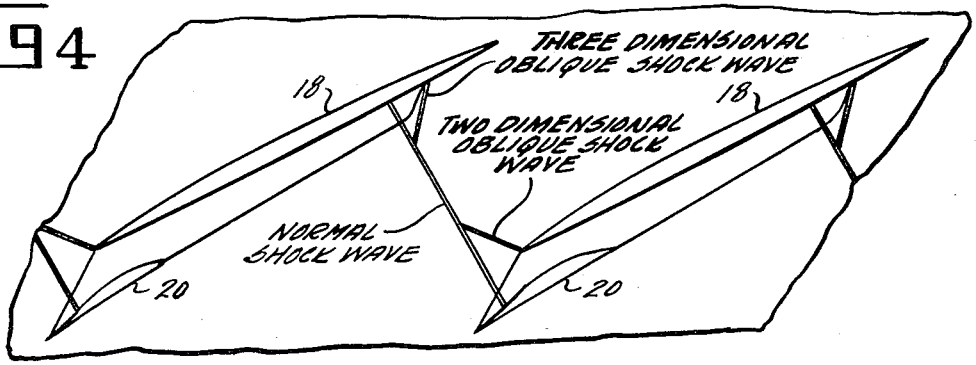
Figure 5:
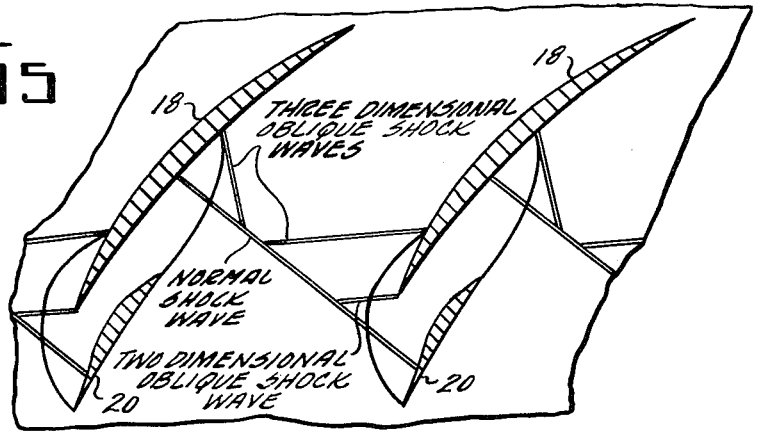
Figure 6:
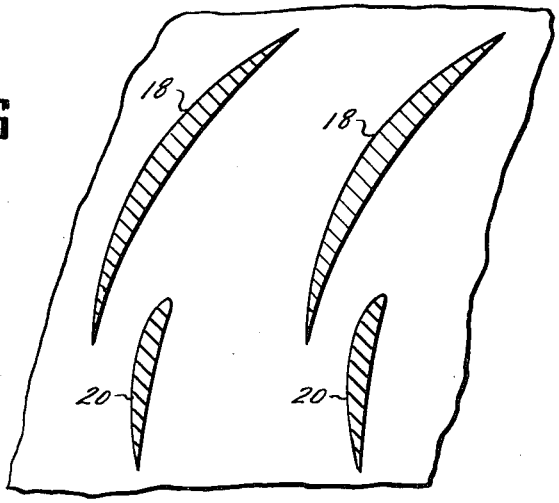

FIGS. 4, 5, and 6 are projections, taken on lines IV—IV, V—V, and VI—VI, respectively, in FIG. 3, illustrating normal air flow conditions between adjacent blades formed in accordance with the present invention.

In FIG. 1 a turbofan rotor 10 rotates within an outer cylindrical casing or cowl 12. As was previously indicated, the rotor is driven to pressurize an air stream which is then employed for propulsive purposes. However, at this point it will be understood that the fan referenced herein is a specialized form of compressor and that at least certain aspects of the invention are applicable to other types of compressors employed for other purposes.

Angularly spaced blades 14 project from the hub 16 of the rotor 10. Each blade comprises a primary, cambered airfoil 18 and an auxiliary airfoil 20. Preferably the auxiliary airfoils are connected to the primary airfoils by radially spaced struts 22 to give rigidity to the auxiliary airfoils as well as for other purposes, later described.

The velocity of air flow relative to the blades 14 is a well known function of the rotational speed of the blades and any given radial distance. The blades 14 illustrated in the drawing are particularly configured for rotational speeds such that in the inner radial portions thereof, adjacent the hub, there will be subsonic air velocities, and, at the tip ends of the blades the relative velocities will approach the upper end of what is commonly referred to as the transsonic velocity range. Transsonic velocities are generally accepted as being between Mach 0.85 and Mach 1.4. Normal shock waves can be generated in this transsonic velocity range as well as at higher velocities.

FIGS. 4 and 5 illustrate that the primary airfoils of adjacent blades are contoured with a flow passage which disposes the normal shock wave downstream of the primary airfoils with one side of the shock wave riding on the auxiliary airfoil 20. This provides stability for the shock wave and disposes it on a surface having a thin, strong, air boundary layer. This latter feature is derived from the fact that the auxiliary airfoil 20 defines a convergent nozzle, having a throat at the trailing edge of the primary airfoil. The surface of the auxiliary airfoil, downstream of this throat section, diverges and is concavely shaped to provide an expansion surface for neutralizing expansion waves originating from the trailing edge of the adjacent primary airfoil. Thus air flowing at subsonic velocities along the pressure surface of the primary airfoil is accelerated by this nozzle, preferably to a choked condition, and expanded, at least locally, to a supersonic flow condition to provide the strong air boundary layer of the auxiliary airfoil on which the shock wave rides.

A further effect of this described configuration is a pressure mixing zone in a triangular area, downstream of the trailing edge of the primary airfoil. This zone is defined by a two-dimensional, oblique shock wave, running lengthwise of the trailing edge of the primary airfoil. Thus, a mixing zone is created which minimizes the pressure gradient across the normal shock wave as it rests or rides on the auxiliary shock wave.

Other features of the invention further reduce the pressure gradient across the normal shock wave as it rests on the auxiliary airfoil 20. These features also reduce the pressure gradient across the opposite side of the normal shock wave when it rests on the pressure surface of the adjacent primary airfoil, as indicated in FIGS. 4 and 5. Reduction of the shock wave pressure gradient on the pressure surface of the primary airfoils is derived from extending the struts 22 beyond the plane of the normal shock wave. By doing this, a conical or three-dimensional, oblique shock wave is created. Thus the pressure rise which must be accomplished in going from transsonic or higher velocities to a subsonic velocity is accomplished in two steps. This is to say that across an oblique shock wave there is, generally speaking, less of a pressure rise than across a normal shock wave. Thus, where oblique shock waves exist in the controlled fashion illustrated, at the surface of the airfoils 18, there is a first pressure gradient across the oblique shock wave and then a second pressure gradient across the normal shock wave, the latter pressure gradient being less than would normally be expected if no oblique wave were created.

FIG. 5 also illustrates that this effect can be created on the suction surface of the primary airfoils by extending the struts 22 along the suction surface in advance of the normal shock wave. In this fashion, and as is illustrated, a three-dimensional, oblique shock wave is created on that surface as well, to further minimize the pressure gradients involved in the normal shock wave.

The provision of struts in the described fashion to create oblique shock waves to minimize the pressure gradients of normal shock waves can be employed independently of the described use of an auxiliary airfoil. By properly spacing the struts and by properly configuring the primary airfoils (or single airfoils if no auxiliary airfoils are used), the normal shock wave would be disposed on the suction surface of the primary airfoils and the struts would minimize the pressure gradients across such normal shock waves and tend to minimize boundary layer air separation at the normal shock wave.

FIG. 6 illustrates that in the hub regions of the blades, where air flow is at subsonic velocities, the auxiliary airfoils are contoured to function as tandem blades to provide for increased turning of the air in these regions.

The described rotor is illustrative and variations of the inventive concepts embodied therein will be apparent to those skilled in the art. The scope of the invention is, therefore, to be derived solely from the appended claims.

Having thus described the invention, what is claimed as novel and desired to be secured by Letters Patent of the United States is:

1. A compressor including an outer cylindrical duct wall and a bladed rotor driven to rotate therein and pressurize a gas stream within the duct, the rate of rotor rotation being sufficient that the velocity of at least a portion of the gas flow through the bladed rotor is in the transonic range, resulting in normal shock waves being created in the flow passages between adjacent blades said rotor having a hub from which angularly spaced blades project, being disposed in a circumferential row, each blade comprising a primary cambered airfoil and an auxiliary airfoil spaced from the pressure surface of the primary airfoil with the leading and trailing edges of the auxiliary airfoil being respectively disposed upstream and downstream of the trailing edge of the primary airfoil, characterized in that the portions of the primary airfoils having transonic air flow therepast, defines, between adjacent primary airfoils, a flow passage for controlling the disposition of the normal shock wave and disposing it on the auxiliary airfoil downstream of one of said adjacent blades and further characterized in that the auxiliary airfoils define, in combination with the pressure surface of their respective primary airfoils, a nozzle means for accelerating gas flow across the surface of the auxiliary airfoil on which the normal shock wave rides, whereby the pressure rise across the shock wave at the auxiliary airfoil surface is minimized and the boundary layer on the airfoil surface is relatively thin.

2. A compressor as in claim 1 wherein
the surface of each auxiliary airfoil downstream of said throat section is concavely curved to neutralize expansion waves originating from the trailing edge of the adjacent primary airfoil.

3. A compressor as in claim 1 wherein
the auxiliary airfoils extend to the hub of the rotor in regions of subsonic gas flow velocities and are contoured as tandem blades in such regions to further turn gas flow through the rotor.

4. A compressor as in claim 1 wherein
laterally extending struts interconnect each primary airfoil and its adjacent auxiliary airfoil.

5. A compressor as in claim 4 wherein
the struts project from the auxiliary airfoils, along the pressure surface of the primary airfoils, upstream of the planes of the normal shock waves to create oblique three dimensional shock waves which reduce the pressure gradients across the normal shock waves.

6. A compressor as in claim 4 wherein
the struts extend from the auxiliary airfoils, along the suction surfaces of primary airfoils to create oblique, three dimensional shock waves which reduce the pressure gradients across the normal shock wave.

7. A compressor including an outer cylindrical duct wall and a bladed rotor driven to rotate therein and pressurize a gas stream within the duct, the rate of rotor rotation being sufficient that the velocity of at least a portion of the gas flow through the bladed rotor is in the transsonic range resulting in normal shock waves being created in the flow passages between adjacent blades, characterized in that struts project laterally from each blade upstream of the plane of the normal shock wave in the gas passageway defined by that plane, whereby oblique, three dimensional shock waves are created which reduce the pressure gradient at the blade surface, of the normal shock wave.

* * * * *